Jan. 4, 1949.  J. G. BAKER  2,458,132
SCHMIDT IMAGE FORMER WITH SPHERICAL
ABERRATION CORRECTOR
Filed June 19, 1945  2 Sheets-Sheet 1
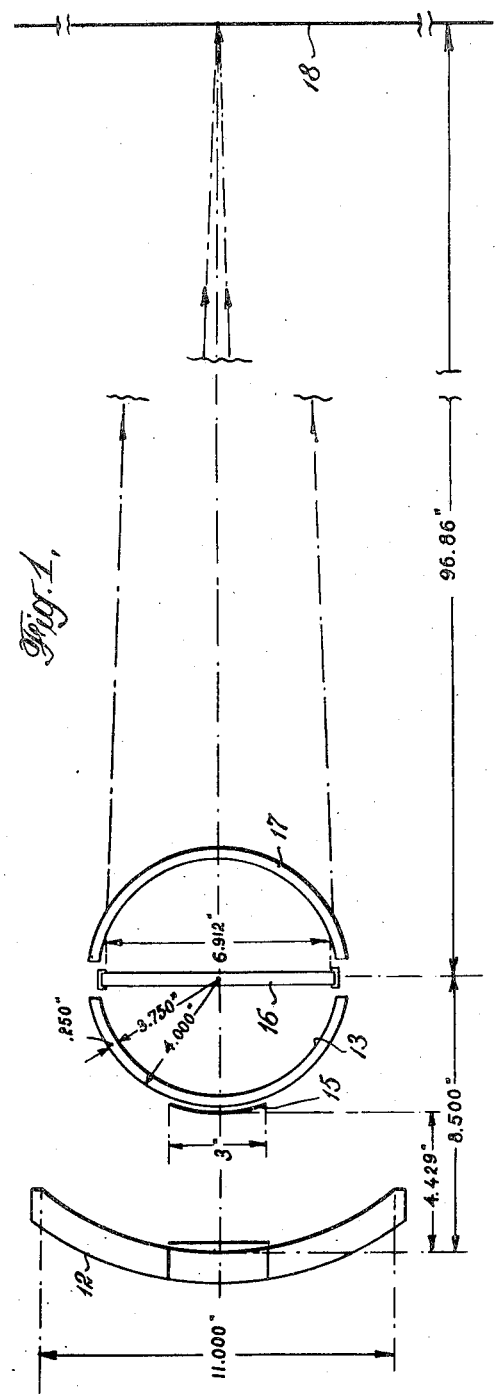
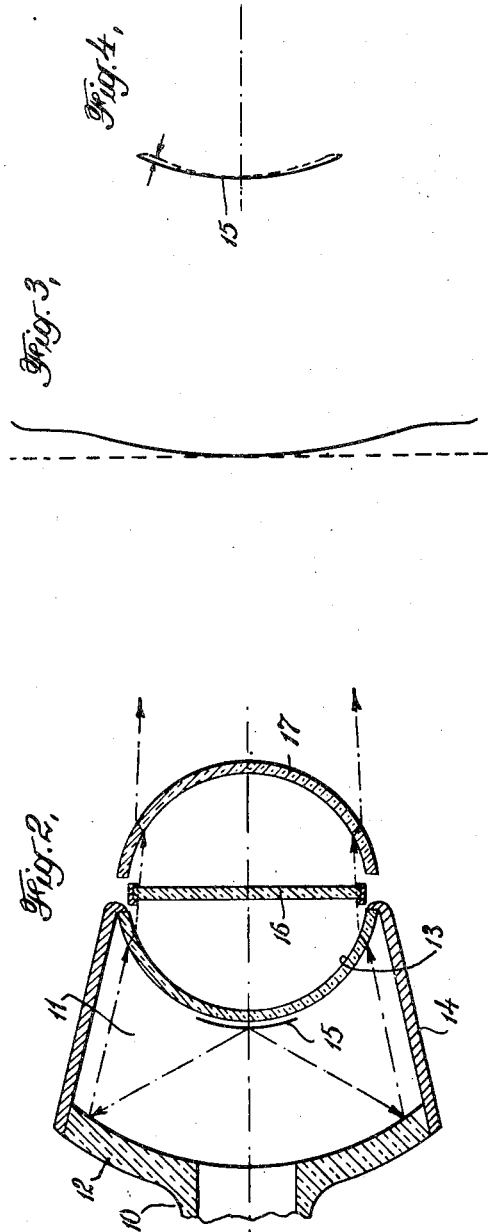
INVENTOR
James G. Baker
BY
Pennie Davis Marvin Edmonds
ATTORNEYS

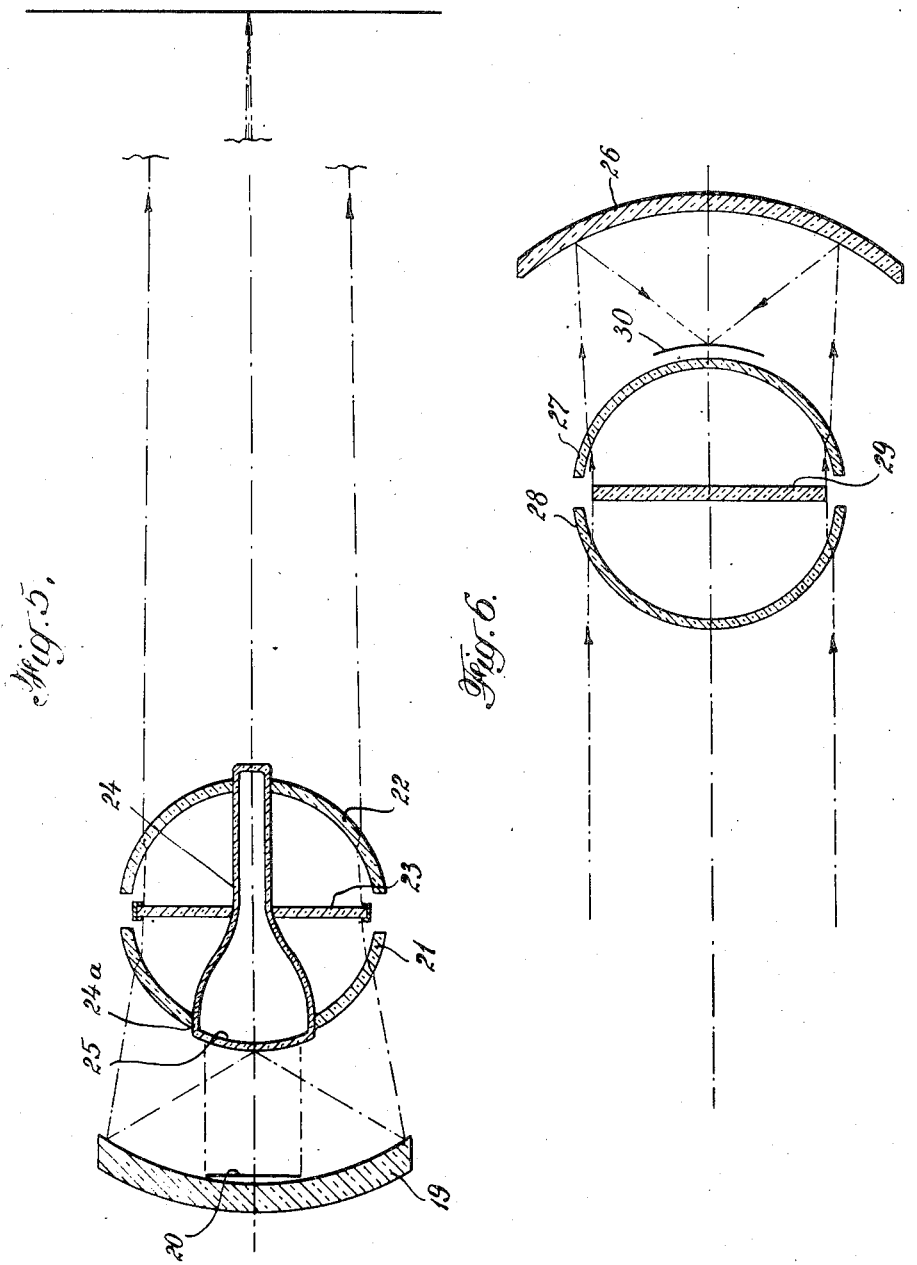

Patented Jan. 4, 1949

2,458,132

UNITED STATES PATENT OFFICE 2,458,132

SCHMIDT IMAGE FORMER WITH SPHERICAL ABERRATION CORRECTOR

James G. Baker, Waban, Mass., assignor to The Perkin-Elmer Corporation, Glenbrook, Conn., a corporation of New York Application June 19, 1945, Serial No. 600,256

9 Claims. (Cl. 88—57)

This invention relates to optical systems constructed to function in accordance with the Schmidt principles or variations thereof and is concerned more particularly with a novel optical system which is an improvement upon an ordinary Schmidt system in various respects. The new system is suitable for use in a wide variety of instruments, such as cameras, telescopes, spectrographs, projectors, etc., but since full advantage is taken of its possibilities when it is employed for projection purposes in a television receiver in association with a cathode ray tube, an embodiment of the invention for that use will be illustrated and described in detail by way of example.

The use of optical systems in television receivers, employing a cathode ray tube, for the purpose of projecting upon a viewing screen an enlarged image of that appearing on the fluorescent screen of the tube is not new, and systems of various kinds utilizing lenses or spherical mirrors have been proposed for the purpose. The combination of a spherical mirror and an aspheric correcting plate counteracting the spherical aberration of the mirror, which was devised by Schmidt, is an optical system that is obviously desirable for television purposes, because the Schmidt catadioptric system has long been known to afford clarity of definition at speeds, and fields of view at such speeds, that are not obtainable with all refracting systems. However, the previous applications of the Schmidt system to television projection use, with which I am familiar, are open to a number of objections and are also subject to limitations in performance which restrict their use.

In one such prior television receiver, the cathode ray tube projects through an opening in the correcting plate toward the mirror and the light is radiated from the rear surface of the fluorescent screen to the mirror. As the brighter surface of the fluorescent screen faces the electron source, the arrangement described operates at an initial disadvantage. The interposition of the cathode ray tube in such a system blocks off a large portion of the aperture and, in order that this lost light may not illuminate the fluorescent screen with consequent loss of contrast in the final image, it is necessary to prevent such action. The desired result has been achieved either by forming the mirror with a central hole of the size and shape of the cathode ray tube or by applying an opaque disc of suitable size and shape to the central area of the mirror. The use of such expedients results in a loss of additional light by vignetting and this effect is enhanced by the formation of the central opening in the correcting plate and mounting the tube to extend through the opening. Because of the factors mentioned, the prior system in a commercial form is constructed to operate at a speed of about F/0.74, equivalent to an effective speed of about F/0.85, and with a field of about 45 degrees.

The present invention is directed to the provision of an optical system which, at considerable field angles, gives markedly superior definition to that of an ordinary Schmidt system of the same F-number, or, for the same definition as that given by an ordinary Schmidt system, permits an increase in speed or aperture. As employed with a television receiver, the new system may be constructed to operate at a speed as fast as F/0.60 in parallel light and, at that speed, gives considerably better definition than the prior system, above referred to, operating at F/0.74. In addition, in television use, the percentage of light lost in the new system because of silhouetting and vignetting is substantially less than the loss in the prior system.

The new system in the preferred form includes a spherical mirror, a pair of thin shells with concentric radii and concentric on either side of the center of curvature of the mirror, and a correcting plate. Each of the shells adds a properly chosen amount of negative spherical aberration to the system with a resultant drastic reduction of the positive spherical aberration of the mirror. The mirror and the two concentric shells form a perfectly symmetrical system and the spherical aberration of this system is considerably less than that of the mirror alone. The correcting plate is, therefore, weaker or flatter than that required in an ordinary Schmidt system of equal speed and the performance at a given field-angle is correspondingly improved.

While the use of two shells as above described gives the best results, it is possible to obtain part of the advantages of the invention by employing a single shell. In such an arrangement, a heavier burden is placed upon the correcting plate and, because of that, the plate must be steeper, so that definition is sacrificed at a given speed, or, for a given standard of definition, there is a reduction in speed or aperture. However, the use of the single shell with the mirror and correcting plate produces a system which is superior to an ordinary Schmidt system.

In the application of the new optical system to television use in association with a cathode ray tube, elements of the system may be incorporated in the tube to form part of the tube envelope. Thus, one of the shells may form the end of the tube adjacent which the fluorescent screen is mounted and the mirror may form part of the wall of the enlargement of the tube within which the screen lies. When the mirror and shell are used in the manner described, they must be made of materials selected to withstand the temperatures to which they will be exposed in the processing and operation of the tube.

For a better understanding of the invention, reference may be made to the accompanying drawings, in which Fig. 1 is a diagrammatic view of one form of the new system with dimensions shown;

Fig. 2 is a longitudinal sectional view through a portion of a cathode ray tube and of the elements of the new system associated therewith;

Fig. 3 is a diagrammatic view showing the curvature of one face of the correcting plate of the new system with the horizontal dimensions multiplied;

Fig. 4 is a diagrammatic sectional view of the fluorescent screen of the cathode ray tube of Fig. 2;

Fig. 5 is a longitudinal sectional view showing another form of the new system associated with a cathode ray tube; and Fig. 6 is a diagrammatic view showing a form of the system suitable for use as a camera.

One form of the optical system of the invention is illustrated in Fig. 2 in association with the cathode ray tube of a television receiver with certain of the elements of the system incorporated as parts of the tube envelope. The dimensions of a specific system suitable for such use are shown in Fig. 1.

The cathode ray tube of Fig. 2 has an envelope formed with a neck 10, in one end of which are mounted the usual cathode serving as a source of electrons, the means for forming the electrons into a beam, the control and focusing electrodes, and the beam-deflecting device. At its other end, the neck opens into an enlargement 11, one wall of which is formed by a spherical mirror 12 silvered on its concave surface. The opposite wall of the enlargement is formed by an optical shell 13 which is concentric with the mirror. The edge of the shell is connected to the outer edge of the mirror by a frusto-conical glass section 14 and the neck, mirror, section, and shell form an envelope which is vacuum-tight. A fluorescent screen 15 is mounted within the envelope and has a convex surface facing the mirror.

A correcting plate 16 is mounted outside the envelope at the center of curvature of the mirror and, although the plate has been illustrated as having flat parallel faces, it is of such curvature as to perform correcting function. The plate is, in effect, a convex lens with asphericity superimposed on both faces, and the cross-sectional shape of one face of the plate, with the horizontal dimensions enlarged twenty times, is shown in Fig. 3. Beyond the plate is a second optical shell 17 which is concentric with the mirror and disposed with its concave surface facing the plate.

The dimensions of a typical example of the new system for use with a cathode ray tube are given in Fig. 1 where it will be seen that the mirror has a radius of 8.500'' and a clear aperture of 11.000''. The shell 13 is made of the glass known commercially as "Pyrex," because of the heat that it must withstand, and it has an outer radius of 4.000'' and an inner radius of 3.750'' so that its thickness is .250''. The shell is concentric with the mirror. The correcting plate 16 is of the glass referred to commercially as DBC-1 and it has a clear aperture of 6.912''. It is figured as needed from a basic radius of 249.'' for each face. The fluorescent screen has a diameter of 3'' and its radius of curvature is 4.261''. The screen is not concentric with the mirror and the distance between its forward face and the mirror is 4.429''. The opening at the center of the mirror is circular and of at least the same diameter as the diameter of the area of the screen projected on straight lines. The shell 17 has the same dimensions as the shell 13, but it is made of the glass known commercially as BSC-2. With the system of the dimensions above given, the picture diameter on the projection screen 18 is 76.772'', the distance from the correcting plate to the projection screen is 96.86'', and the magnification is 23.79 times.

As pointed out above, the purpose of the shells is to introduce a properly chosen amount of negative spherical aberration into the system, so that the positive spherical aberration of the mirror is drastically reduced and the work to be performed by the correcting plate is also greatly reduced. It is well known that the nearer the correcting plate in an ordinary Schmidt system is to flatness, the better is the performance at a given field-angle. As the correcting plate in the new system is weaker or flatter than that required in an ordinary Schmidt system of equal speed, the definition of the new system is markedly superior to that of an ordinary Schmidt system of the same F-number at considerable field angles. Conversely, for the same definition in the projected image, the speed or aperture of the new system can be increased over that of a conventional Schmidt system. Another advantage in using the shells is that the color correction for most zones is better than in an ordinary Schmidt system, since the positive curve on the correction plate is always acting against the negative contributions of the shells.

The shells may vary in thickness, and as their thickness increases, the burden on the correcting plate is reduced and a flatter plate may be used. The shell thickness adopted represents a compromise between the size of the mirror and the correction burden on the correcting plate. Increasing the thickness of the shells reduces the burden on the plate and increases the mirror size for a given focal length of the system. For a system operating at a speed of F/0.60, the permissible upper limit in thickness of the shells is ⅛ of the equivalent focal length, that is, ⅛ of the distance between the center of curvature of the mirror and the focal point. For systems to operate at lower speeds, the thickness of the shells may be greater, as, for example, for a system to operate at F/1, the shells may have a thickness up to ½ the equivalent focal length. With shells of that maximum thickness, no correcting plate is required. However, shells of less thickness are preferred and with shells of a thickness of .25'' in the example of the system described, variations in correction over the aperture are minimized. The shells need not be identical in thickness, but if one is thicker than the other, the overall correction by zones is impaired. The radii of the surfaces of the shells should be as long as possible and the maximum radius is ordinarily that at which the surface of one shell is in direct contact with the fluorescent screen. However, it is practical in some applications to seat the screen in a depression in the convex surface of the adjacent shell, in which event the radius of the convex surface of that shell is somewhat greater than in the system illustrated.

The glass used for the shells may have a mean index of refraction ($n_D$) varying from about 1.4 to 1.8 and it is advantageous to employ a glass having as low a dispersion, that is, as high a $\nu$-value, as possible. The shells introduce negative color which is corrected by the plate. By making the shells of glass of low dispersion, less burden is imposed upon the plate. The chromatism of the shells can be overcome by causing them to depart individually from concentric surfaces within themselves but, for a given standard of definition, this results in a reduction in the field angle, according to the departure adopted.

The fluorescent screen 15 in the new system, which corresponds to the photographic film in an ordinary Schmidt camera, is approximately spherical and concentric with the mirror. The departures from sphericity and also from concentricity are obviously necessary, because the projection screen is at a finite distance, whereas in the Schmidt camera, the corresponding distance is infinity. The shape and position of the fluorescent screen will vary, therefore, with the distance between the correcting plate and the projection screen but may be readily determined. For many projection purposes, a screen of spherical shape is suitable but for highest precision, the screen will be formed with the slight zone indicated by dotted lines in Fig. 4. The greatest depth of the zone will be 0.0035" in a screen of three inch diameter, for the magnification and focal length adopted.

In the foregoing, I have described the use of the new system in association with a cathode ray tube in a television receiver, with elements of the system incorporated in the tube envelope to form walls bounding the evacuated space. This arrangement is to be preferred, since the light striking the mirror comes from the surface of the screen upon which the electrons impinge. In some instances, however, it may be desirable to make use of the system in a form in which the elements of the system do not form parts of the tube envelope, and such a construction is shown in Fig. 5. In that arrangement, the spherical mirror 19 is provided with a central opening or else the central area is covered by an opaque black baffle 20. The shells 21, 22 and the correcting plate 23 are formed with central openings through which the cathode ray tube 24 may be inserted with the enlarged end 24a of the tube facing the mirror. The fluorescent screen 25 within the end of the tube is disposed at the proper distance from the mirror by reason of the position of the tube. The light striking the mirror comes from the back surface of the screen and passes through the wall of the tube envelope on its way to the mirror. The correcting plate must, accordingly, be designed to correct for the spherical aberration of the mirror as modified by the shells as well as for the error introduced by the tube end wall, as will be obvious. The diameter of the baffle is substantially the same as that of the screen projected in straight lines parallel to the axis of the system.

In Fig. 6, a form of the new system suitable for use as a camera or imaging system is shown. This system includes a spherical mirror 26, with the shells 27, 28 and the correcting plate 29, as previously described. The focal surface of the system is curved, as indicated at 30 and lies at a distance from the mirror equal to one-half the radius of the latter.

As pointed out above, the materials employed for the shells and correcting plate in the new system should be selected in order that chromatic aberration may be reduced as much as possible, but, in some applications, other requirements must be fulfilled. Thus, in a system, such as that shown in Fig. 2, in which the mirror and one shell form parts of the envelope of the cathode ray tube, the mirror and shell should be made of a material capable of withstanding the temperatures to which they are exposed in the processing and operation of the tube. The materials used in the correcting plate and second shell will then be chosen to obtain the desired chromatic effects, in view of the limitation on the choice of the material for the first shell. The selection of the materials will be clear to one skilled in the art of optical design and the color removal conditions can be expressed in an equation relating the lens power of the shells and correcting plate to their desired dispersions for any specific example of the system.

I claim:

1. An optical system for use in cameras, projectors, and other instruments which comprises, as essential elements, a spherical reflector, a spherical shell substantially concentric with the reflector and lying on one side of the center of curvature thereof, the shell adding such an amount of negative spherical aberration to the system as to effect a substantial reduction in the positive spherical aberration produced by the reflector, and an aspheric correcting plate located substantially at the center of curvature of the reflector and figured to correct for the residual spherical aberration of the combination of the reflector and shell.

2. An optical system for use in cameras, projectors, and the like, the essential elements of the system consisting of a spherical reflector, a spherical shell substantially concentric with the reflector and lying on one side of the center of curvature thereof, the shell adding such an amount of negative spherical aberration to the system as to effect a substantial reduction in the positive spherical aberration produced by the reflector, and an aspheric correcting plate located substantially at the center of curvature of the reflector and figured to correct for the residual spherical aberration of the combination of the reflector and shell, the correcting plate being formed of an optical material which will correct for the chromatism of the shell.

3. An optical system for use in cameras, projectors, and other instruments which comprises, as essential elements, a spherical reflector, a pair of spherical shells substantially concentric with the reflector and lying on opposite sides of the center of curvature thereof with their concave surfaces opposed, the shells adding such an amount of negative spherical aberration to the system as to effect a substantial reduction in the positive spherical aberration produced by the reflector, and an aspheric correcting plate lying between the shells and figured to correct for the residual spherical aberration of the combination of the reflector and shells.

4. An optical system for use in cameras, projectors, and the like, the essential elements of the system consisting of a spherical reflector, a pair of spherical shells substantially concentric with the reflector and lying on opposite sides of the center of curvature thereof with their concave surfaces opposed, the shells adding such an amount of negative spherical aberration to the system as to effect a substantial reduction in the positive spherical aberration produced by the reflector, and an aspheric correcting plate lying between the shells and figured to correct for the residual spherical aberration of the combination of the reflector and shells, the correcting plate being formed of an optical material which will correct for the chromatism of the shells.

5. An optical system for operation at a speed of about F/0.60 in parallel light in cameras, projectors, and other instruments, which comprises a spherical reflector, a pair of spherical shells substantially concentric with the reflector and lying on opposite sides of the center of curvature thereof with their concave surfaces opposed, each shell having substantially concentric convex and concave surfaces and a thickness not exceeding about ⅛ the equivalent focal length of the reflector, the radius of the convex surface of each shell being about equal to equivalent focal length of the reflector, the shells adding such an amount of negative spherical aberration to the system as to effect a substantial reduction in the positive spherical aberration produced by the reflector, and an aspheric correcting plate lying between the shells and figured to correct for the residual spherical aberration of the combination of the reflector and shells.

6. A system as defined in claim 5, in which the correcting plate is located substantially at the center of curvature of the reflector.

7. An optical system for operation at a speed of about F/1 in parallel light in cameras, projectors, and other instruments, which comprises a spherical reflector, a pair of spherical shells substantially concentric with the reflector and lying on opposite sides of the center of curvature thereof with their concave surfaces opposed, each shell having substantially concentric convex and concave surfaces and a thickness not exceeding about ½ the equivalent focal length of the reflector, the radius of the convex surface of each shell being about equal to the equivalent focal length of the reflector, the shells adding such an amount of negative spherical aberration to the system as to effect a substantial reduction in the positive spherical aberration produced by the reflector, and an aspheric correcting plate lying between the shells and figured to correct for the residual spherical aberration of the combination of the reflector and shells.

8. A system as defined in claim 7, in which the correcting plate is located substantially at the center of curvature of the reflector.

9. An optical system which comprises a spherical reflector, a pair of like spherical shells concentric with the reflector and lying on opposite sides of the center of curvature thereof with their concave surfaces opposed, and an aspheric correcting plate lying between the shells and figured to correct for the residual spherical aberration of the combination of the reflector and shells, the elements of the system having the following relative dimensions:

|  | Inches |
|---|---|
| Reflector radius | 8.500 |
| Reflector clear aperture | 11.000 |
| Shells, outer radius | 4.000 |
| Shells, inner radius | 3.750 |
| Correcting plate basic radius, each face | 249.000 |
| Correcting plate clear aperture | 6.912 |

JAMES G. BAKER.

REFERENCES CITED

The following references are of record in the file of this patent:

UNITED STATES PATENTS

| Number | Name | Date |
|---|---|---|
| 2,170,979 | Straubel | Aug. 29, 1939 |
| 2,229,302 | Martin | Jan. 21, 1941 |
| 2,298,808 | Ramberg | Oct. 13, 1942 |
| 2,305,855 | Epstein et al. | Dec. 22, 1942 |
| 2,409,971 | Bennett | Oct. 22, 1946 |

FOREIGN PATENTS

| Number | Country | Date |
|---|---|---|
| 544,694 | Great Britain | Apr. 23, 1942 |

OTHER REFERENCES

Maksutor article, "New Catodioptric Meniscus System," Journal Opt. Soc. Amer., vol. 34, No. 5, 1944, pages 270–284, pages 270–273 cited.